United States Patent Office 2,751,401
Patented June 19, 1956

2,751,401

4-CHLOROPREGNANE-17α,21-DIOL-3,11,20-TRIONE AND 21-ESTERS THEREOF

Arthur R. Hanze and Robert H. Levin, Kalamazoo Township, Kalamazoo County, Mich., assignors to The Upjohn Company, Kalamazoo, Mich., a corporation of Michigan No Drawing. Application August 28, 1953,
Serial No. 377,263

2 Claims. (Cl. 260—397.45)

The present invention relates to steroid compounds and is more particularly concerned with novel 4-chloro-21-acyloxy-17α-hydroxypregnane-3,11,20-triones, especially those wherein the 21-acyloxy group is of the formula AcO, Ac being the acyl radical of a hydrocarbon carboxylic acid containing from one to eight carbon atoms, inclusive. Illustrative of such acyloxy groups are formyloxy, acetoxy, propionyloxy, butyryloxy, isobutyryloxy, valeryloxy, hexanoyloxy, heptanoyloxy, octanoyloxy, etc. 4-chloro-21-acetoxy-17α-hydroxypregnane-3,11,20-trione, is of particular interest.

This application is a continuation-in-part of our copending applications, Serial No. 249,617, filed October 3, 1951, now Pat. No. 2,666,067; Serial No. 251,451, filed October 15, 1951, now Pat. No. 2,666,068; and Serial No. 304,224, filed August 13, 1952, now Pat. No. 2,666,072.

It is an object of the present invention to provide novel 4-chloro-21-acyloxy-17α-hydroxypregnane-3,11,20-triones, especially those wherein the 21-acyloxy group is of the formula AcO, Ac being the acyl radical of a hydrocarbon carboxylic acid containing from one to eight carbon atoms, inclusive. Other objects of the present invention will be apparent to one skilled in the art to which this invention pertains.

The 4-chloro-21-acyloxy-17α-hydroxypregnane-3,11,20-triones of the present invention are useful as important chemical intermediates. For example, selective hydrolysis of the 21-acyloxy group using potassium bicarbonate in aqueous methanol at about room temperature provides the novel 4-chloro-17α,21-dihydroxypregnane-3,11,20-trione, a reaction which is entirely unsatisfactory for the preparation of the corresponding 4-bromo-21-hydroxy compound from the known corresponding 4-bromo-21-acyloxy compounds since the 4-bromine atom also reacts. Dehydrohalogenation of the 4-chloro-21-hydroxy compound by treatment with semi-carbazide hydrochloride followed by pyruvic acid produces cortisone.

The novel 4-chloro-21-acyloxy-17α-hydroxypregnane-3,11,20-triones also are useful for the preparation of cortisone acylates, which are obtained directly by dehydrohalogenation using semi-carbazide hydrochloride followed by pyruvic acid. Although the known corresponding 4-bromo compounds can also be converted to cortisone acylates in the same manner, the 4-chloro-21-acyloxy-17α-hydroxypregnane-3,11,20-triones of the present invention have entirely different properties which also make these 4-chloro compounds inordinately superior to the corresponding 4-bromo compounds as intermediates for the production of cortisone acylates. For example, the 4-chloro-21-acyloxy-17α-hydroxy-3,11,20-triones of the present invention are much more stable than the corresponding 4-bromo compounds to decomposition by heat, light, and air oxidation. As a result, the 4-chloro compounds of the present invention usually are isolated in a considerably higher state of purity, and greatly reduced losses are encountered on subsequent purification, if required at all, than with the corresponding 4-bromo compounds. Furthermore, the 4-chloro compounds, because of their greater stability, are more conveniently handled and stored without significant decomposition, usually no special precautions to avoid decomposition being required. In addition, these 4-chloro compounds are frequently much more soluble in organic solvents than the corresponding 4-bromo compounds. This permits reacting a 4-chloro compound in more concentrated solution than is possible with a corresponding 4-bromo compound, e. g., in one method, dehydrohalogenation can be effected with the 4-chloro-21-acetoxy compound at twice the concentration as is possible with the corresponding 4-bromo-21-acetoxy compound. This permits savings in equipment size, quantity of solvent, time in solvent removal, etc. The 4-chloro-21-acyloxy-17α-hydroxypregnane - 3,-11,20-triones of the present invention, therefore, provide a distinct economic advantage over the corresponding 4-bromo compounds. Other uses and advantages of the compounds of the present invention will be apparent to one skilled in the art.

The 4-chloro-21-acyloxy-17α-hydroxypregnane-3,11,20-triones of the present invention may be prepared by various methods. One method is the simultaneous oxidation and chlorination of a 21-acyloxy-3α(or β),17α-dihydroxypregnane-11,20-dione using N-chlorosuccinimide. A second method is the simultaneous oxidation and chlorination of a 21-acyloxy-3α(or β),17α-dihydroxypregnane-11,20-dione using hypochlorous acid. An additional method is the chlorination of a 21-acyloxy-17α-hydroxypregnane-3,11,20-trione using N-chlorosuccinimide. Another method is the chlorination of a 21-acyloxy-17α-hydroxypregnane-3,11,20-trione using chlorine dissolved in an organic solvent. These various methods of preparation are more fully described in the examples.

The following examples are illustrative of the present invention but are not to be construed as limiting.

*Example 1.—4-chloro-21-acetoxy-17α-hydroxypregnane-3,11,20-trione*

To two grams (4.92 millimoles) of 21-acetoxy-3α,17α-dihydroxypregnane-11,20-dione dissolved in 96 milliliters of tertiary butyl alcohol and three milliliters of water was added 1.64 grams (12.3 millimoles) of N-chlorosuccinimide. The mixture was allowed to stand for one and one-half days at room temperature. The resulting crystalline product was filtered off, washed with tertiary butyl alcohol, and the solid product dried in a vacuum desiccator. The yield was 1.25 grams (52.1 percent) of 4-chloro-21-acetoxy-17α-hydroxypregnane-3,11,20-trione, having a melting point of 239-243 degrees centigrade. The specific rotation was $[\alpha]_D^{24}$ plus 100 degrees (acetone).

Analysis.—Calculated for $C_{23}H_{31}O_6Cl$: C, 62.8; H, 7.11; Cl, 8.07. Found: C, 62.86; H, 7.36; Cl, 9.32.

Treatment of 4-chloro-21-acetoxy-17α-hydroxypregnane-3,11,20-trione with about one molar equivalent of potassium bicarbonate in aqueous methyl alcohol solution at about room temperature using nitrogen gas to exclude air, provides 4-chloro-17α,21-dihydroxypregnane-3,11,20-trione, which, on dehydrohalogenation with semicarbazide hydrochloride followed by pyruvic acid, produces cortisone.

*Example 2.—4-chloro-21-propionyloxy-17α-hydroxypregnane-3,11,20-trione*

In exactly the same manner as given in Example 1, 4-chloro-21-propionyloxy-17α-hydroxypregnane-3,11,20-trione is prepared from 21-propionyloxy-3α,17α-dihydroxypregnane-11,20-dione and N-chlorosuccinimide.

*Example 3.—4-chloro-21-octanoyloxy-17α-hydroxypregnane-3,11,20-trione*

In exactly the same manner as of Example 1, 4-chloro-21-octanoyloxy-17α-hydroxypregnane-3,11,20-trione is prepared using 21-octanoyloxy-3α,17α-dihydroxypregnane-11,20-dione instead of 21-acetoxy-3α,17α-dihydroxypregnane-11,20-dione.

In the same manner as given in Examples 1 through 3, starting with the corresponding 21-acyloxy-3,17α-dihydroxypregnane-11,20-dione, the following compounds are prepared: 4-chloro-21-formyloxy-17α-hydroxypregnane-3,11,20-trione; 4-chloro-21-butyryloxy-17α-hydroxypregnane-3,11,20-trione; 4-chloro-21-valeryloxy-17α-hydroxypregnane-3,11,20-trione; 4-chloro-21-hexanoyloxy-17α - hydroxypregnane - 3,11,20 - trione; 4 - chloro - 21 - heptanoyloxy - 17α - hydroxypregnane - 3,11,20 - trione; 4 - chloro - 21 - (β - cyclopentylpropionyloxy) - 17α-hydroxypregnane - 3,11,20 - trione; and the like.

*Example 4.—4-chloro-21-acetoxy-17α-hydroxypregnane-3,11,20-trione*

To one gram (2.46 millimoles) of 21-acetoxy-3α,17α-dihydroxypregnane-11,20-dione [prepared from 3α,17α-dihydroxypregnane-11,20-dione (Sarett, J. Am. Chem. Soc., 70, 1454 (1948)) by bromination in the 21-position using bromine in chloroform at about room temperature and subsequent replacement of the 21-bromine atom by reaction with potassium acetate in refluxing acetone] in 39 milliliters of tertiary butyl alcohol was added 10.9 milliliters of water containing 6.15 millimoles of hypochlorous acid. The mixture was allowed to stand for several days, after which time the solid was filtered off and the filtrate concentrated to twenty milliliters. The concentrated filtrate was allowed to stand overnight. The resulting crystals were filtered off and added to the first crop. The 4-chloro-21-acetoxy-17α-hydroxypregnane-3,11,20-trione melted at about 240–244 degrees centigrade. Dehydrohalogenation of the product using semicarbazide hydrochloride followed by pyruvic acid provides cortisone acetate.

*Example 5.—4-chloro-21-acetoxy-17α-hydroxypregnane-3,11,20-trione*

The starting 21-acetoxy 3β,17α-dihydroxypregnane-11,20-dione is prepared from pregnane-3,11,20-trione [Reichstein and Fuchs, Helv. Chim. Acta, 26, 721 (1943)] in the following manner. Reduction of the pregnane-3,11,20-trione with Raney nickel catalyst in methanol gives 3β-hydroxypregnane-11,20-dione, which is then treated with acetic anhydride or other anhydride containing paratoluenesulfonic acid to form the 3β,20-diacetoxy-17(20)-pregnene-11-one. Treatment of this latter compound with peracetic acid in chloroform followed by saponification with dilute alkali yields 3β,17α-dihydroxypregnane-11,20-dione. Bromination of this compound using bromine and chloroform at about room temperature is productive of bromination of the 21-position and subsequent replacement of the 21-bromine atom by reaction with potassium acetate in refluxing acetone gives the starting 3β,17α-dihydroxy-21-acetoxy or other 21-acyloxypregnane-11,20-dione [Sarett, J. Am. Chem. Soc., 70, 1454 (1948)].

In the same manner as given in Example 4, 4-chloro-21 - acetoxy - 17α - hydroxypregnane - 3,11,20 - trione is prepared using the 21 - acetoxy - 3β,17α - dihydroxypregnane-11,20-dione instead of the 21-acetoxy-3α,17α-dihydroxypregnane-11,20-dione.

Following the procedure of Example 4, other 4-chloro-21 - acyloxy - 17α - hydroxypregnane - 3,11,20 - triones are prepared from the appropriate 21-acyloxy-3β,17α-dihydroxypregnane-11,20-dione and hypochlorous acid.

*Example 6.—4-chloro-21-propionyloxy-17α-hydroxypregnane-3,11,20-trione*

In the same manner as given in Example 4, 4-chloro-21 - propionyloxy - 17α - hydroxypregnane - 3,11,20-trione is prepared from 21-propionyloxy-3α,17α-dihydroxypregnane-11,20-dione and hypochlorous acid.

In the manner of Examples 4 through 6, starting with the corresponding 21 - acyloxy - 3,17 - dihydroxypregnane-11,20-dione, the following compounds are prepared: 4 - chloro - 21 - formyloxy - 17α - hydroxypregnane - 3,11,20 - trione; 4 - chloro - 21 - propionyloxy - 17α - hydroxypregnane - 3,11,20 - trione; 4 - chloro - 21 - butyryloxy - 17α - hydroxypregnane - 3,11,20 - trione; 4 - chloro - 21 - valeryloxy - 17α - hydroxypregnane - 3,11,20 - trione, 4 - chloro - 21 - hexanoyloxy - 17α - hydroxypregnane-3,11,20 - trione; 4 - chloro - 21 - heptanoyloxy - 17α - hydroxypregnane - 3,11,20 - trione; 4 - chloro - 21 - octanoyloxy - 17α - hydroxypregnane - 3,11,20 - trione; 4-chloro - 21 - phenylacetoxy - 17α - hydroxypregnane - 3,11,20-trione; and the like.

*Example 7.—4 - chloro - 21 - acetoxy - 17α - hydroxypregnane-3,11,20-trione*

To 1.0 millimole of 21-acetoxy-17α-hydroxypregnane-3,11,20-trione [prepared from a 3,17α-dihydroxy-21-acetoxypregnane-11,20-dione by oxidation in the 3-position with N-bromoacetamide in basic solution] dissolved in tertiary butyl alcohol, was added 0.75 milliliter of water containing concentrated hydrochloric acid equivalent to one millimole of hydrogen chloride and two millimoles of N-chlorosuccinimide. The mixture was allowed to stand for two days at room temperature whereafter the crystals were filtered off. The filtrate was partially concentrated and allowed to stand overnight. A second crop of crystals was filtered off. The 4-chloro-21-acetoxy-17α-hydroxypregnane-3,11,20-trione product was identical with that obtained in Example 1.

*Example 8.—4 - chloro - 21 - butyryloxy - 17α - hydroxypregnane-3,11,20-trione*

In the same manner as given in Example 7, 4-chloro-21-butyryloxy - 17α - hydroxypregnane - 3,11,20 - trione is prepared from 21 - butyryloxy - 17α - hydroxypregnane-3,11,20-trione using N-chloro-succinimide.

*Example 9.—4 - chloro - 21 - octanoyloxy - 17α - hydroxypregnane-3,11,20-trione*

In the same manner as given in Example 7, 4-chloro-21 - octanoyloxy - 17α - hydroxypregnane - 3,11,20-trione is prepared from 21 - octanoyloxy - 17α - hydroxypregnane-3,11,20-trione using N-chloro-succinimide.

In the same manner as given in Examples 7 through 9, starting with the corresponding 21-acyloxy-17α-hydroxypregnane - 3,11,20 - triones, the following compounds are prepared: 4 - chloro - 21 - formyloxy - 17α - hydroxypregnane - 3,11,20 - trione; 4 - chloro - 21 - propionyloxy-17α - hydroxypregnane - 3,11,20 - trione; 4 - chloro - 21-isobutyryloxy - 17α - hydroxypregnane - 3,11,20 - trione; 4 - chloro - 21 - valeryloxy - 17α - hydroxypregnane-3,11,20 - trione; 4 - chloro - 21 - hexanoyloxy - 17α hydroxypregnane - 3,11,20 - trione; 4 - chloro - 21 - isooctanoyloxy - 17α - hydroxypregnane - 3,11,20 - trione; etc.

*Example 10.—4-chloro-17α-hydroxy-21-acetoxypregnane-3,11,20-trione*

17α-hydroxy-21-acetoxypregnane-3,11,20-trione (0.404 gram; 0.001 mole) was dissolved in five milliliters of dimethylformamide and a few crystals of para-toluenesulfonic acid were added. A chlorine solution was prepared by bubbling about 0.9 gram of chlorine gas into 25 milliliters of ice-cold dimethylformamide, resulting in a chlorine concentration, as determined by titration, of 1.04 normal. To the solution containing the steroid, while being stirred with a magnetic stirrer, was added dropwise 2.3 milliliters (0.00120 mole) of the chlorine solution. Each drop was allowed to decolorize before the next was added, the addition requiring about seven minutes. The reaction mixture was then diluted with fifty milliliters of water and cooled. The precipitate which formed was collected, washed with water and dried. The yield of 4-chloro-17α-hydroxy-21-acetoxypregnane-3,11,20-trione was 0.401 gram (91 per cent);

Example 11.—4-chloro-17α-hydroxy-21-butyryloxy-pregnane-3,11,20-trione

Following the procedure given in Example 10, 4-chloro-17α-hydroxy-21-butyryloxypregnane-3,11,20-trione is prepared in high yield and purity by chlorination of 17α-hydroxy-21-butyryloxypregnane-3,11,20-trione with chlorine in N-methyl-N-ethyl-formamide.

Example 12.—4-chloro-17α-hydroxy-21-pentanoyloxy-pregnane-3,11,20-trione

Following the procedure given in Example 10, 4-chloro-17α-hydroxy-21-pentanoyloxypregnane-3,11,20-trione is prepared in high yield and purity by chlorination of 17α-hydroxy-21-pentanoyloxypregnane-3,11,20-trione with chlorine in N-methyl-N-ethyl-acetamide.

Following the procedure given in Examples 10 through 12 other 4-chloro-17α-hydroxy-21-acyloxypregnane-3,11,20-triones are prepared from the appropriate 17α-hydroxy-21-acyloxypregnane-3,11,20-trione and chlorine, such as, for example, 4-chloro-17α-hydroxy-21-propionyloxy-pregnane - 3,11,20 - trione; 4-chloro-17α-hydroxy-21-hexanoyloxypregnane - 3,11,20 - trione; 4-chloro-17α-hydroxy-21-heptanoyloxypregnane-3,11,20-trione; 4-chloro-17α-hydroxy-21-trimethylacetoxypregnane-3,11,20-trione; etc.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A 4 - chloro - 21 - acyloxy - 17α - hydroxypregnane - 3,11,20-trione represented by the formula

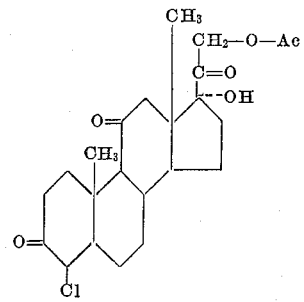

wherein Ac is the acyl radical of a hydrocarbon carboxylic acid containing from one to eight carbon atoms, inclusive.

2. 4-chloro-21-acetoxy-17α-hydroxypregnane - 3,11,20 - trione.

References Cited in the file of this patent

UNITED STATES PATENTS 2,541,104    Sarett _____ Feb. 13, 1951